United States Patent [19]

Pache et al.

[11] 4,319,123

[45] Mar. 9, 1982

[54] METHOD OF CONTROLLING A MAGNETICALLY GUIDED WELDING ARC

[75] Inventors: Norbert Pache, Augsburg; Franz-Josef Ganowski, Maingründel; Karel Mazac, Augsburg, all of Fed. Rep. of Germany

[73] Assignee: Industrie-Werke Karlsruhe Augsburg Aktiengesellschaft, Augsburg, Fed. Rep. of Germany

[21] Appl. No.: 74,298

[22] Filed: Sep. 11, 1979

[30] Foreign Application Priority Data

Sep. 12, 1978 [DE] Fed. Rep. of Germany ....... 2839544

[51] Int. Cl.³ ............................................. B23K 9/08
[52] U.S. Cl. .................................. 219/123; 219/60 R; 219/100
[58] Field of Search .................. 219/123, 60 R, 60 A, 219/59.1, 100, 101, 104

[56] References Cited

U.S. PATENT DOCUMENTS 3,341,685 9/1967 Paton et al. ......................... 219/100
3,484,578 12/1969 Sciaky ................................ 219/123

FOREIGN PATENT DOCUMENTS 129179 4/1978 Fed. Rep. of Germany .

Primary Examiner—C. C. Shaw
Attorney, Agent, or Firm—Karl F. Ross

[57] ABSTRACT

A pair of workpieces are welded together by passing between them an arc which is guided by a magnetic field to rotate on the workpieces. Immediately after striking of the arc the field strength of the magnetic field is relatively great and a relatively great current is similarly passed through the arc. During a subsequent main phase, before fusing of the surfaces to be welded, the field strength and the current of the arc are reduced to a fraction of their values for even heating of the surfaces to be welded together. Finally during a terminal phase the current of the arc and the field strength are again raised to a higher level to completely fuse the two surfaces which can then be welded together once the arc is interrupted.

4 Claims, 3 Drawing Figures

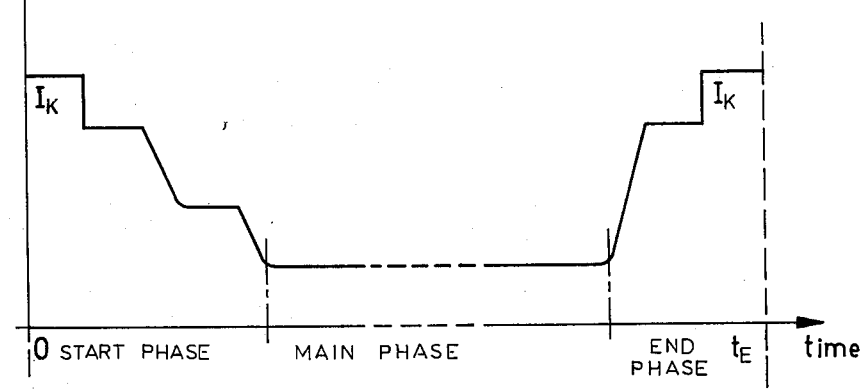
FIG. 1
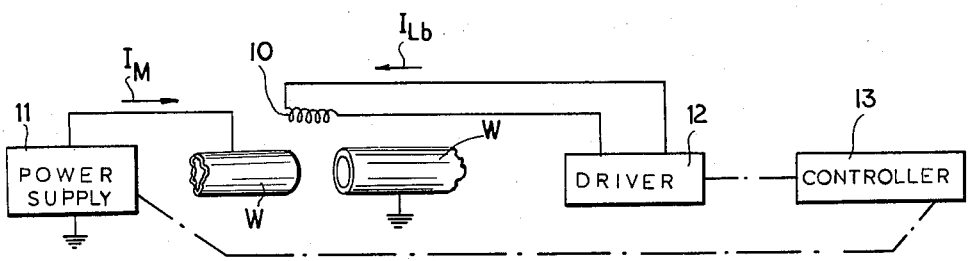
FIG. 2
FIG. 3

METHOD OF CONTROLLING A MAGNETICALLY GUIDED WELDING ARC

FIELD OF THE INVENTION

The present invention relates to a method of welding. More particularly this invention concerns a method of controlling a magnetically guided welding arc.

BACKGROUND OF THE INVENTION

It is known to control the arc in automatic production welding machines by means of a magnetic field. This can be done in fusion, butt, roll-seam, TIG, MIG, MAG, and friction-end welding. The procedure is frequently applied to the welding of tubes or workpieces with tubular projections, although it is not limited to rotation-symmetrical elements.

Two main methods are used for welding with a magnetically guided welding arc. The arc can either be drawn between the two workpieces being welded or can be drawn between a nonconsumed auxiliary electrode and the workpieces to be joined. In either situation the techniques of magnetically guiding the arc can be combined with those of the known resistance, arc, and friction welding advantageously.

The wandering or rotation of the arc is caused by well-known magnetic principles. Every current flow is accompanied by a magnetic field, this field forming concentric circles about a circular conductor, which an electric arc of a welding process can be considered to be. If this arc, which is generating its own electric field, passes through another stationary magnetic field, the magnetic lines of force will align themselves. The magnetic field lines tend to shorten themselves, so that the arc will become stationary within the additional fixed magnetic field. The force of this field can be determined by means of the well-known left-hand rule.

Particular difficulties are encountered in the welding of relativley thick workpieces, where the shape of the edge to be welded can vary considerably. To date it has been impossible to heat the entire end surface to be welded uniformly within a limited time period. For maximum efficiency the welding time of a magnetically guided arc, that is the actual burn time for the arc, should be held at a minimum. Thus once the arc has been struck it should move with a uniform speed about the surface to be welded so that the entire surface is uniformly treated and uniform results will be obtained from weld to weld.

German Pat. No. 129,179 discloses an arrangement where at the end of a so-called prewarming stage the current density is increased considerably, so as to constitute a sort of current shock. This current shock liquefies the previously uniformly heated welding surfaces and is self-limited by the subsequent upsetting operation. The problem with this system lies in striking of the arc, as with limited current density it is difficult to determine the exact instant at which the arc will be drawn, so that the extent to which the workpiece will be warmed before the above-mentioned current shock will vary from workpiece to workpiece, so that the welds themselves will also vary. Obviously this can be overcome by increasing the welding time per item, however this increase will decrease production efficiency which makes it undesirable.

U.S. Pat. No. 3,484,578 discloses a method wherein at the beginning of the welding operation the welding current is maintained relatively low while a relatively strong magnetic field is applied. In this manner striking of the arc is relatively easy. Nonetheless with this system, as with the system of the above-discussed German patent, it is necessary to strike the arc to either space the two elements between which the arc is to be drawn relatively closely, or to employ a relatively high tension. As a result it is difficult to form a uniform weld. Furthermore at the end of the welding operation the current increase has to be considerable, while regulating the speed of travel of the arc becomes quite difficult.

In practice it has been found necessary to space the parts being welded together by a distance between 2 mm and 3 mm. When, however, the welding current is limited it becomes difficult to strike an arc under these circumstances. Even when a relatively high starting voltage is employed striking the arc is problematic.

OBJECTS OF THE INVENTION

It is therefore an object of the present invention to provide an improved method of welding with a magnetically guided welding arc.

Another object is to provide such a method which ensures uniform results from workpiece to workpiece.

A further object is to provide such a method which overcomes the disadvantages of the above-discussed methods.

SUMMARY OF THE INVENTION

These objects are attained according to the instant invention in a welding method wherein a relatively strong magnetic field is employed and a relatively great current is passed through the arc during a start phase commencing at the striking of the arc. Thereafter during a subsequent main phase the strength of the field and the current of the arc are reduced to a fraction of their start-phase values. Finally during a terminal phase at the end of which the arc is wholly interrupted the current of the arc is increased to a multiple of its main-phase value.

According to another feature of this invention both the current and the field strengh are increased during the terminal phase to a multiple of the main-phase values. The current strength of the arc is at least twice as great during the start phase as during the main phase according to this invention, and the field strength and current are increased and decreased between stages stepwise according to this invention.

BRIEF DESCRIPTION OF THE DRAWING

FIGS. 1 and 2 are graphs illustrating the method according to this invention; and FIG. 3 is a schematic illustration of a system for carrying out the method according to this invention.

SPECIFIC DESCRIPTION

As shown in FIG. 3, two workpieces W, here tubes, to be welded together are axially juxtaposed adjacent a schematically illustrated arc-control coil 10. One of the tubes W is grounded and the other is connected to a welding power supply 11. A driving circuit 12 is connected to the coil 10 and a controller 13 is connected to both the driver 12 and power supply 11.

According to this invention and as illustrated graphically in FIGS. 1 and 2 immediately after striking of an arc at time=0 the current $I_{LB}$ that flows through the coil 10 is held at a relatively high level $I_K$, while simultaneously the current flowing through the arc between the two workpieces W is similarly set at a relatively high level $I_M$. This makes the arc move at a relatively high rotational speed and, as a result of the high current of this arc, considerable energy is imparted to the workpieces W. In this manner a rapid and uniform warming of the end surfaces of the workpieces W is obtained.

Since a high arc current nonetheless invariably leads to fusing of the surfaces, which cannot possibly be uniform in a limited time, the currents are both reduced during a subsequent main phase to a level equal to approximately one-third of the currents of the start phase, it being understood that the current through the coil 10 is approximately proportional to its field strength. Thus the somewhat weaker arc will move somewhat more slowly around the surfaces to be welded so that in due course the outer edges of the surfaces will be solid while the inner edges, where the arc first impinges, will be liquid. The still solid outer edges will maintain the liquefied portions of the surfaces in place.

In an end phase the currents are again lifted to relatively high levels, equal to their levels during the start phase. This increased current will melt even the outer edges of these surfaces so that even flowing-together of the outer seam is ensured.

Finally at an end time $t_E$ the two workpieces W are abutted, the arc is wholly interrupted, and the assembly is allowed to cool. The weld is completed.

As illustrated in FIGS. 1 and 2 the currents are increased and decreased stepwise during the start and end phases. It is, of course, possible to increase and decrease them continuously if desired.

It has been found that the system according to the instant invention gives extremely good results with workpieces having a wall thickness greater than 3 mm.

The results are uniform from workpiece to workpiece, so that the method according to this invention is ideally suitable for a large-scale and fully automatic production operation.

We claim:

1. In a welding method wherein an arc through which current flows is struck between a pair of spaced-apart tubular workpiece portions and is thereafter guided by a magnetic field of variable field strength, the improvement comprising the steps of sequentially:

employing a relatively strong magnetic field and passing a relatively great current through said arc during a start phase commencing at striking of said arc;

reducing during a subsequent main phase the strength of said field and the current of said arc to a fraction of their values during the start phase;

increasing during a terminal phase the current of said arc to a multiple of its value during said main phase; and immediately thereafter interrupting said arc wholly and generally at the same time engaging said workpiece portions together.

2. The method defined in claim 1 wherein the strength of said field is also increased in said terminal phase to a multiple of its value during said main phase.

3. The method defined in claim 1 wherein the current of said arc is at least twice as great during said start phase as during said main phase.

4. The method defined in claim 1 wherein said strength and said current are increased and decreased stepwise.

* * * * *